(12) United States Patent
Gopalakrishnan et al.

(10) Patent No.: US 7,009,949 B1
(45) Date of Patent: Mar. 7, 2006

(54) ASYMMETRIC RATE FEEDBACK AND ADJUSTMENT SYSTEM FOR WIRELESS COMMUNICATIONS

(75) Inventors: Nandu Gopalakrishnan, Chatham, NJ (US); Teck H. Hu, Budd Lake, NJ (US); Farooq Ullah Khan, Manalapan, NJ (US); Achilles George Kogiantis, Madison, NJ (US); Pantelis Monogioudis, Randolph, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 734 days.

(21) Appl. No.: 09/716,106

(22) Filed: Nov. 17, 2000

(51) Int. Cl.
*H04Q 7/00* (2006.01)
(52) U.S. Cl. .................. 370/329; 370/236; 370/465
(58) Field of Classification Search ............... 370/329, 370/328, 331, 332, 333, 335, 342, 336, 337, 370/347, 441, 442, 465, 468, 236
See application file for complete search history.

(56) References Cited

U.S. PATENT DOCUMENTS

| 5,825,761 A | 10/1998 | Tanaka ................ 370/333 |
| 6,496,543 B1 * | 12/2002 | Zehavi ................ 375/295 |

FOREIGN PATENT DOCUMENTS

EP        0 651 531 A2    5/1995

OTHER PUBLICATIONS

WO 00 16513 A (Ericsson Telefon AB L M) Mar. 23, 2000 abstract, p. 11, line 13 - p. 14, line 16, figures 5, 6.
European Search Report dated Nov. 27, 2001.

* cited by examiner

*Primary Examiner*—Brian Nguyen
(74) *Attorney, Agent, or Firm*—J. A. Garceran; M. I. Finston

(57) ABSTRACT

A rate feedback and adaptation scheme or system uses a rate of rate feedback asymmetrical with the rate of data rate adaptation. In particular, the rate adaptation system provides a rate of rate feedback slower than the rate of rate adaptation. Thus, by allowing the base station to change the data rate more frequently than the individual wireless units reports the rate information, the rate adaptation system can provide improved flexibility and more efficient use of wireless resources while reducing the processing and transmission overhead required to report the rate information. For example, every 3 slots, a wireless unit can calculate and report a rate for the wireless unit to use on a shared channel to send data. The base station receives the rates from the wireless units seeking to send data over the shared channel and selects a wireless unit to use the shared channel. If the base station can adapt the data rate every slot, the base station can adapt the data rate in accordance with a rate reported by another wireless unit, thereby improving system performance. Because of the small slot duration (for example, 0.67 microseconds), the relatively reduced rate of reporting should not adversely effect system performance since it is highly unlikely that the achievable data rate will change over a period of a slot under most operating conditions.

5 Claims, 3 Drawing Sheets

ASYMMETRIC RATE FEEDBACK AND ADJUSTMENT SYSTEM FOR WIRELESS COMMUNICATIONS

BACKGROUND OF THE INVENTION

1. Field of the Invention

This invention relates to wireless communications and, more particularly, to a rate feedback and adjustment system.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles voice communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Traditional data applications are typically bursty and, unlike voice communications, relatively delay tolerant. As such, using dedicated links to transmit data is an inefficient use of network resources. Wireless communication systems are evolving that will support a variety of data services, such as wireless web browsing.

In the well known data only evolution of the third generation CDMA standard (hereinafter referred to as 3G-1x EVDO), voice and data services are provided using separate frequency carriers. That is, the voice and data signals are transmitted over separate forward links defined by different frequency carriers. Data is transmitted over a time division multiplexed carrier at fixed data transmit powers but at variable data rates. Specifically, measured signal to interference ratio (SIR) at the receiver is used to determine a data rate which can be supported by the receiver. Typically, the determined data rate corresponds to a maximum data rate at which a minimum level of quality of service can be achieved at the mobile-telephone. Higher measured SIR translates into higher data rates, wherein higher data rates involve higher order modulation and weaker coding than lower data rates.

To improve system throughput, the system allows the wireless unit with the best channel, and thereby the highest rate, to transmit ahead of wireless units with comparatively low channel quality. 3G-1x EVDO uses a fast rate adaptation mechanism whereby the wireless unit performs the rate calculation at every slot using measurements of a pilot signal broadcast from the base station and reports back the rate at which it is going to receive data from the base station at every slot. In a symmetrical fashion, the base station receives a reported rate at every slot and sends data at the reported rate at every slot. The symmetrical rates for rate calculation and rate adaptation in 3G-1x EVDO disadvantageously requires large processing overhead for rate calculation and prediction every slot. Additionally, large transmission overhead is required to feedback the rate every slot.

In the Universal Mobile Telecommunications System (UMTS), wireless units communicate with a base station over dedicated channels. To provide efficient wireless data communications, UMTS uses a downlink shared channel which can be shared by a plurality of wireless units to receive data. To improve system throughput, the system provides the wireless unit with the best reported rate access to the shared channel. To alleviate the processing and transmission overhead problems associated with calculating and reporting the rate every slot, rate adaptation systems have been proposed that report the rate every 5 to 8 slots and in symmetrical fashion, the rate is adapted by the system every 5 to 8 slots.

SUMMARY OF THE INVENTION

The present invention is a rate feedback and adaptation scheme or system where the rate of rate feedback is asymmetrical with the rate of data rate adaptation. In particular, the rate adaptation system provides a rate of rate feedback slower than the rate of rate adaptation. Thus, by allowing the base station to change the data rate more frequently than the individual wireless units reports the rate information, the rate adaptation system can provide improved flexibility and more efficient use of wireless resources while reducing the processing and transmission overhead required to report the rate information. For example, every 3 slots, a wireless unit can calculate and report a rate for the wireless unit to use on a shared channel to send data. The base station receives the rates from the wireless units seeking to send data over the shared channel and selects a wireless unit to use the shared channel. If the base station can adapt the data rate every slot, the base station can adapt the data rate in accordance with a rate reported by another wireless unit, thereby improving system performance. Because of the small slot duration (for example, 0.67 microseconds), the relatively reduced rate of reporting should not adversely effect system performance since it is highly unlikely that the achievable data rate will change over a period of a slot under most operating conditions.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments of the rate adaptation system are described with respect to a rate adaptation system where the rate of rate feedback is asymmetrical with the rate of rate adaptation. Such asymmetry can be exploited because: 1) frame boundaries on the uplink can be staggered or asynchronous, so rate changes from the users are received at different times; and 2) while it is better to keep the feedback rate on the uplink low (for example, so as not to load the uplink with high rate feedback whose very high rate is of minimal benefit), it is advantageous to provide a finer rate granularity on the downlink, thereby allowing the system to adapt the shared data channel quickly in response to a better rate report from a different wireless unit which is selected to use the shared data channel.

Figure 1:
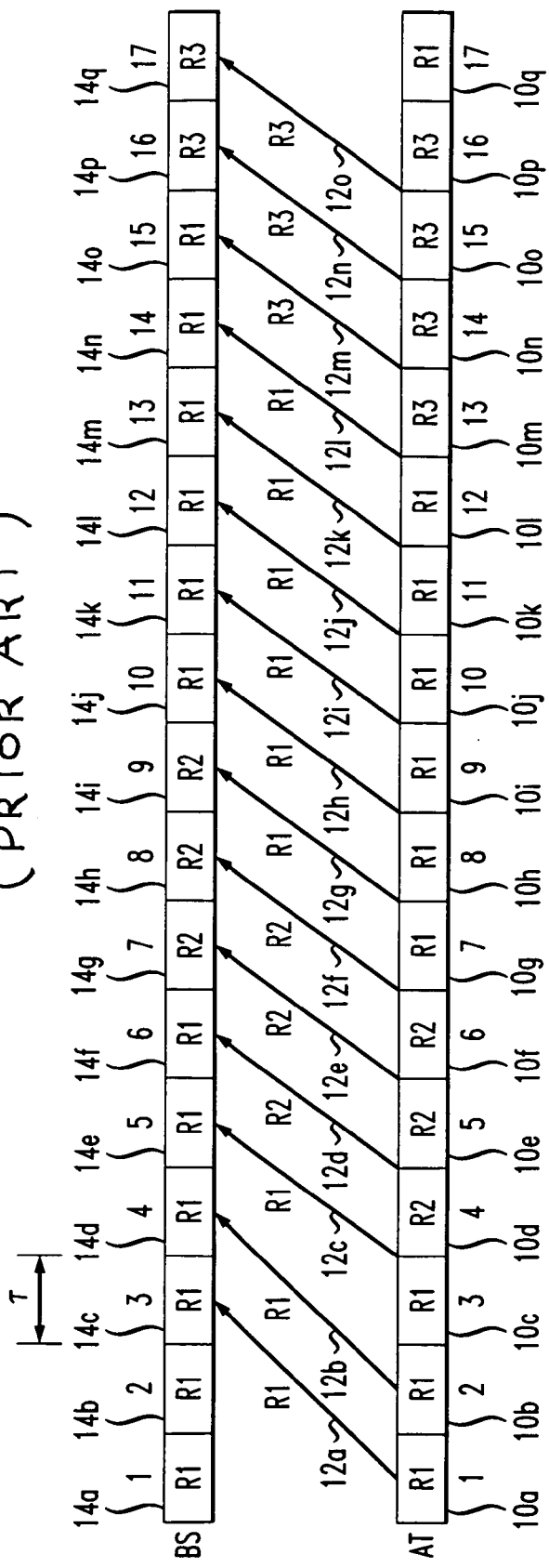
FIG. 1 shows a general signaling diagram between a base station and wireless unit in which rate is reported and adjusted according to the prior art.

FIG. 1 depicts a signaling diagram between a base station (BS) and a wireless unit or access terminal (AT) for a rate adaptation system in the 3G-1x EVDO system. The calculation and reporting of the rate for the dedicated data channel by the wireless unit, for example after making measurements of a pilot signal from the base station, is performed once every time slot 10a–q with communications 12a–o. The downlink data channel is divided into time slots each of which has a duration of 1.67 milliseconds. From the perspective of the wireless unit the time slots are referenced as time slots 10a–q, and from the base station perspective the time slots are referenced as time slots 14a–q. The base station adapts the rate for the downlink data channel once every time slot. In the embodiment of FIG. 1, the wireless unit noticed a change in the channel quality at slot 4 (10d), for example by performing signal quality measurements on a downlink pilot signal from the base station. The wireless unit calculated a new rate R2 for the base station to use on the downlink data channel and unit reported back the rate R2 to the base station with communication 12d. Due to the delays in the transmission and propagation of the communication 12d, the base station received the reported rate R2 at slot 6 (14f). Since the base station updates the rate at every slot, which is symmetrical to the rate reporting rate, the base station changes the rate to R2 at slot 7 (14g).

Disadvantageously, the symmetrical feedback and control rate approach described for the embodiment of FIG. 1 requires large processing overhead to calculate and predict the rate at every time slot 12a as well as large transmission overhead due to rate feedback every slot. It has been realized that due to the very small slot duration, it is highly unlikely that the rate will change over a period of a few slots under most operating conditions, thereby reporting at every clock cycle wastes system resources with little benefit. If the reporting rate is decreased along with the rate adaptation rate gain in the symmetrical fashion known in the art, the system loses flexibility and loses some potential improvements in efficient use of resources and/or improved throughput.

Figure 2:
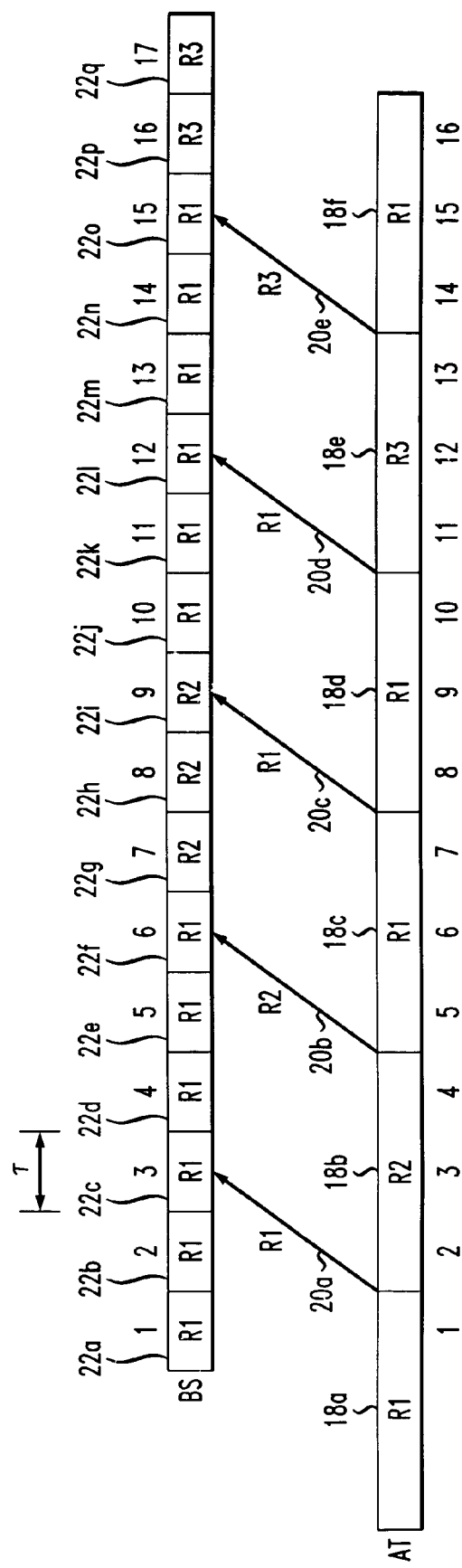
FIG. 2 shows a general signaling diagram between a base station and a wireless unit using an embodiment of the rate adaptation system according to principles of the present invention.

In accordance with principles of the present invention, a rate calculation and adaptation system is proposed where the rate calculation and/or reporting is performed at a rate which is asymmetrical with the adaptation of the rate. In particular, the rate calculation and/or reporting is slower than the rate of adapting the rate of the data channel. FIG. 2 shows a signaling diagram for an embodiment of the rate calculation and adaptation system where the sending of rate feedback is spread over more than a single slot in order to reduce the rate feedback and rate calculation (processing) overhead. In FIG. 2, the wireless unit or access terminal (AT) calculates and reports rate information every 3 slots. To calculate the rate information, the wireless unit can perform a signal quality measurement on a downlink signal, such as the pilot channel, and receive other base station information, such as available transmit power at the base station and available channelization codes at the base station. Using the signal and/or base station information, the wireless unit can calculate rate information which can be in the form of a configuration or set of coding, modulation and/or antenna(s) which inherently provide a particular data rate.

Accordingly, FIG. 2 shows rate calculation and reporting intervals 18a–f with each rate calculation and reporting interval 18a–f being three slots long where each slot is 0.667 ms long. At the end of a rate calculation and/or reporting interval 18a–f, the wireless unit reports the rate information in a report 20a–e to the base station. After the base station receives the report 20a–e, the rate calculation and/or reporting and adaptation system adapts the rate or configuration for the data channel in the next slot 22a–q.

Figure 3:
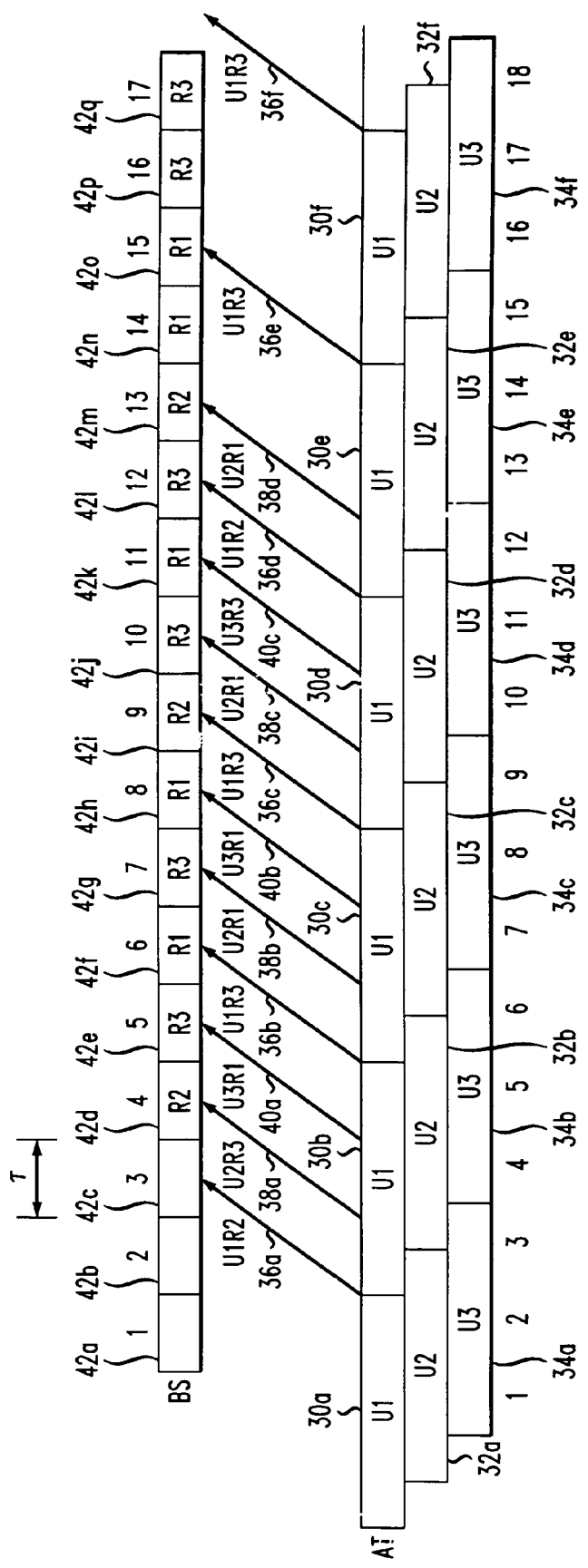
FIG. 3 shows a general signaling diagram between multiple wireless units and a base station using an embodiment of the rate adaptation system according to the principles of the present invention.

FIG. 3 shows how a rate feedback (calculation and/or reporting) and rate adaptation system can operate with multiple wireless units (U1, U2 and U3) having staggered rate feedback intervals. In particular, unit U1 has feedback intervals 30a–f, and at the end of each feedback interval 30a–f, the unit U1 sends rate information in a report 36a–f to the base station. The unit U2 has feedback intervals 32a–f, and at the end of each feedback interval 32a–f, the unit U2 sends rate information in a report 38a–d. The unit U3 has feedback intervals 34a–f, and at the end of each feedback interval 34a–f, the unit U3 sends rate information in a report 40a–c. In the embodiment of FIG. 3, the base station can receive rate feedback at every slot 42a–q from the multiple units U1–U3 when the users are not synchronized or staggered in a synchronized fashion to receive the rate feedback at different slots from the different units U1–U3. In response, the base station can adapt or change the rate of the data channel at every slot 42a–q.

Thus, the rate feedback and adaptation system can more efficiently use available resources and/or improve throughput by more rapidly reacting to the rate feedback from a plurality of non-synchronized or staggered units on the uplink. Additionally, because the feedback rate is slower than the adaptation rate, the processing and transmission overhead due to rate calculation and feedback is reduced.

In addition to the embodiment(s) described above, the rate feedback and adaptation system has been described for use in a UMTS system where the downlink data channel is a shared, time division multiplexed channel made up of at least one channelization code. The rate feedback and adaptation system according to the principles of the present invention can be used with different cellular systems and uplink and/or downlink configurations which omit and/or add components and/or use variations or portions of the described system. For example, the rate feedback and adaptation system can be implemented in whole or in part at the base station in response to other information, such as signal measurements which are sent from the wireless unit. Moreover, the rate information fed back to the base station can include a code sequence which maps to a particular configuration, including coding, modulation and/or antennas, for the base station to adapt the data channel for communication with the wireless unit. Alternatively, the rate information could include a rate or other information the base station can use to calculate a rate or appropriate configuration to communicate over the data channel.

It should be understood that the system and portions thereof and of the described architecture can be implemented in different locations, such as the wireless unit, the base station, a base station controller and/or mobile switching center using the base station as a conduit. Moreover, the rate feedback and adaptation system can be implemented in application specific integrated circuits, software-driven processing circuitry, firmware, programmable logic devices, hardware, discrete components or arrangements of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method for a base station to adapt data rates for transmission to wireless terminals, comprising:

receiving a plurality of data-rate feedback reports from a group of two or more said terminals, and selecting transmission data rates in response to at least some said reports at periodic adaptation intervals, wherein:

the base station receives reports from each individual terminal of said group at intervals longer than an adaptation interval;

the reception of reports from said group is spread over time such that reports from different terminals are received in different timeslots; and in the selecting of transmission data rates, the base station responds to the report from at least one terminal of said group in each adaptation interval by responsively selecting a transmission data rate.

2. The method of claim 1, wherein the base station receives reports from each individual terminal of said group at intervals of three timeslots.

3. The method of claim 1, wherein the adaptation interval is one timeslot.

4. The method of claim 1, wherein the the base station receives reports from each individual terminal of said group at intervals of a multiple number of timeslots, and the reporting times are staggered according to a regular pattern such that the reports from each said individual terminal are received at a fixed timeslot position within the adaptation interval.

5. The method of claim 1, wherein the data-rate feedback reports from said group are received asynchronously.

* * * * *